United States Patent
Ito et al.

(10) Patent No.: US 6,912,652 B2
(45) Date of Patent: *Jun. 28, 2005

(54) METHOD AND APPARATUS FOR IMPRINTING ID INFORMATION INTO A DIGITAL CONTENT AND FOR READING OUT THE SAME

(75) Inventors: Hirofumi Ito, Los Angeles, CA (US); Shinichi Yamashita, Kawasaki (JP)

(73) Assignee: Monolith Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 346 days.

(21) Appl. No.: 09/304,644

(22) Filed: May 4, 1999

(65) Prior Publication Data

US 2001/0013097 A1 Aug. 9, 2001

Related U.S. Application Data

(63) Continuation of application No. PCT/US97/20309, filed on Dec. 6, 1997.

(30) Foreign Application Priority Data

Nov. 8, 1996 (JP) .............................. 8-296830
Sep. 9, 1997 (JP) .............................. 9-282468

(51) Int. Cl.[7] .......................... H04L 9/00; G06F 17/60
(52) U.S. Cl. ...................... 713/151; 713/193; 380/202; 705/51; 705/58
(58) Field of Search ............................ 380/3, 4, 25, 9, 380/49, 201–204; 713/200, 201, 193, 176; 705/51–54, 57–59

(56) References Cited

U.S. PATENT DOCUMENTS 4,528,588 A * 7/1985 Löfberg ....................... 705/58
4,890,319 A  12/1989 Seth-Smith et al. ........... 380/5

(Continued)

FOREIGN PATENT DOCUMENTS

| EP | 0 665 486 A2 | 8/1995 | |
| EP | 0 665 486 A | 8/1995 | |
| EP | 0 705 022 A2 | 4/1996 | |
| EP | 0 705 022 A | 4/1996 | |
| EP | 0 734 140 A | 9/1996 | |
| EP | 0 762 417 A | 3/1997 | |
| JP | 4-248771 | 9/1992 | |
| JP | 06-237362 | 8/1994 | |
| JP | 7-221967 | 8/1995 | |
| JP | 0705022 A2 * | 9/1995 | ............ H04N/1/32 |
| JP | 07-239828 | 9/1995 | |
| JP | 0762417 A2 * | 8/1996 | ............ G11B/20/00 |
| WO | WO 96/36163 | 11/1996 | |

OTHER PUBLICATIONS

R.G. van Schyndel et al., "A Digital Watermark", Proceedings of the Intl. Conf. on Image Processing IC, Austin, vol. 2, Nov. 13, 1994, pp. 86–90.

I.J. Cox et al. "Secure Spread Spectrum Watermarking for Images, Audio and Video", Proceedings of 3rd IEEE Intl. Conf. on Image Processing, Lausane, vol. 3, Sep. 16, 1996, pp. 243–246.

Primary Examiner—Gilberto Barrón, Jr.
(74) Attorney, Agent, or Firm—Fleshner & Kim, LLP

(57) ABSTRACT

After a digital content is loaded into an information terminal such as a PC, ID information unique to a viewer or a user of the PC is imprinted into the content. The ID information is imprinted into a predetermined location of the content or alternatively, it may be imprinted over the entire content in the form of a spatial frequency. The content with an ID added thereto is then enabled to be used in the terminal.

13 Claims, 7 Drawing Sheets

U.S. PATENT DOCUMENTS

| | | | | |
|---|---|---|---|---|
| 5,287,407 A | | 2/1994 | Holmes | 705/58 |
| 5,467,169 A | | 11/1995 | Morikawa | 355/201 |
| 5,546,462 A | | 8/1996 | Indeck et al. | |
| 5,554,842 A | | 9/1996 | Connell et al. | 235/491 |
| 5,568,555 A | | 10/1996 | Shamir | 380/51 |
| 5,613,004 A | | 3/1997 | Cooperman et al. | 380/28 |
| 5,649,013 A | * | 7/1997 | Stuckey et al. | 705/58 |
| 5,664,018 A | | 9/1997 | Leighton | 380/54 |
| 5,719,943 A | * | 2/1998 | Amada et al. | 380/49 |
| 5,729,594 A | * | 3/1998 | Klingman | 379/93.12 |
| 5,737,413 A | * | 4/1998 | Akiyama et al. | 380/4 |
| RE35,839 E | * | 7/1998 | Asai et al. | 380/3 |
| 5,883,958 A | * | 3/1999 | Ishiguro et al. | 380/4 |
| 5,901,127 A | * | 5/1999 | Sako et al. | 369/59 |
| 5,910,987 A | | 6/1999 | Ginter et al. | |

\* cited by examiner

| 1-1 | 2+1 | 0+0 |
|-----|-----|-----|
| 2-1 | 0+1 | 1+0 |
| 1+1 | 0-1 | 1+1 |

Fig. 16

METHOD AND APPARATUS FOR IMPRINTING ID INFORMATION INTO A DIGITAL CONTENT AND FOR READING OUT THE SAME

This application is a Continuation of Application No. PCT/US/97/20309 filed Dec. 6, 1997.

This invention relates to a method for imprinting identification information (ID) into a digital content and for reading that information.

BACKGROUND

The information superhighway was advocated in the United States in 1991, and since then distribution of information over networks as represented by the Internet has been forming a new society base. In this new network society, secure encryption and authentication are desired in such fields as electronic commerce because such fields are concerned with safety.

On the other hand, one of the principles of the Internet is the free distribution of digital contents such as pictures, animation and music (hereinafter collectively referred to as contents). Presently, even for valuable content, such as cultural works, illegal copies can be easily made and distributed. Collecting fees for using contents on the Internet, preventing illegal reproduction or modification, and protecting copyrights are serious problems that need to be addressed and solved. These issues are extremely important for the mutual development of a network society and culture.

It is therefore desired to design a general approach to trace illegal copies of digital contents.

SUMMARY

It is the object of this invention to provide an identification (ID) imprinting method applicable to existing contents.

It is a further object of this invention to provide an ID imprinting method applicable to a content having no reserved areas or areas for remarks that do not play any role in the content.

It is still another object of this invention to provide an ID imprinting method which does not introduce substantial degradation of the content quality when an ID information is imprinted.

It is yet another object of this invention to provide an ID imprinting method for embedding an ID information that can be easily detected.

It is yet another object of this invention to provide an ID readout method to easily detect and interpret the ID information imprinted in the content.

A method according to an embodiment of the present invention comprises loading a content into an information terminal where the content is used and imprinting an ID information associated to the information terminal or its user into a predetermined location in a perceivable portion of the loaded content. (A content may be any collection of digital data, and may be in the form of a sequence of data values. A perceivable portion contains data that play a role in the content, rather than reserved areas or areas for remarks that do not play any role in the content.)

The content is first loaded into an information terminal. Subsequently, an ID information is imprinted into a predetermined location of the content. A user who reproduces illegal copies of the content is identified with the ID information imprinted therein. Since the ID information is imprinted in a predetermined location, no string search is necessary. This method is applicable to existing contents, since it requires no special data blocks beforehand.

In another aspect of the invention, an ID information is imprinted in the form of spatial frequency information into the entire content loaded into an information terminal. "Spatial frequency information" is information relative to a spatial frequency in any sense. In this aspect, the ID information is converted into spatial frequency information via, for instance, an inverse orthogonal transformation so as to be reflected in the content data. The inverse orthogonal transformation may be an inverse fast Fourier transform (IFFT) or an inverse discrete cosine transform (IDCT). This method is also applicable to existing contents.

According to the ID reading process of this invention, a content is first obtained for instance via a network, and an ID information is read from a predetermined location thereof. The ID information is uniquely associated with an information terminal or its user. In another aspect, spatial frequency information is extracted from the obtained content, and then supplied for an orthogonal transformation. Through the transformation, the ID information imprinted in the content is restored. An orthogonal transformation may be a fast Fourier transform (FFT), a discrete cosine transform (DCT), and so forth.

BRIEF DESCRIPTION OF THE DRAWINGS

The above and the other objects, features, and advantages, will become further apparent from the following description of the preferred embodiment taken in conjunction with the accompanying drawings wherein:

FIG. 16 is a diagram showing the state in which either an offset 0 or ±1 is added to the luminance of respective pixels to change the state shown in FIG. 14 into that shown in FIG. 15.

DETAILED DESCRIPTION OF THE EMBODIMENTS

Figure 1:
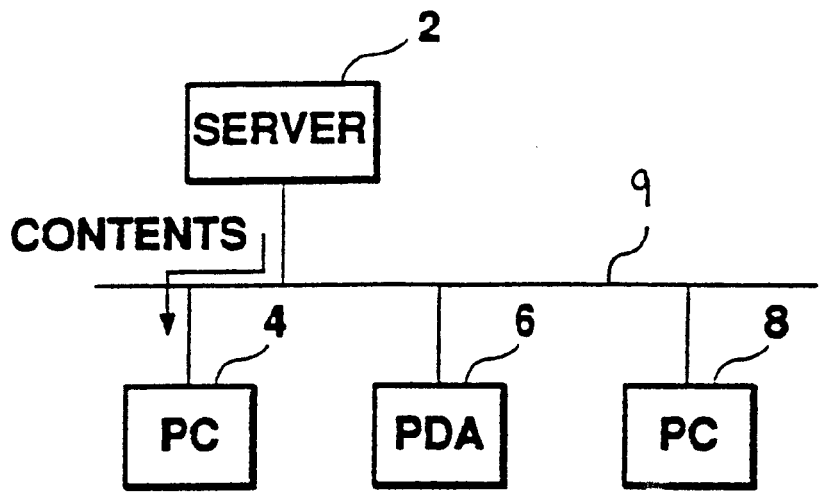
FIG. 1 is a diagram showing a network system to which a preferred embodiment of the present invention is applied.

The present invention may be applied to a network system comprising a server 2 and client devices connected on a network 9, as shown in FIG. 1. In this drawing, client devices include PCs 4 and 8 and a Personal Digital Assistance (PDA) 6, which are information terminals.

The server 2 supplies a content to the client devices so that ID imprinting is carried out on the client side. Here, as an example, the PC 4 is provided with an imprinting function.

Figure 2:
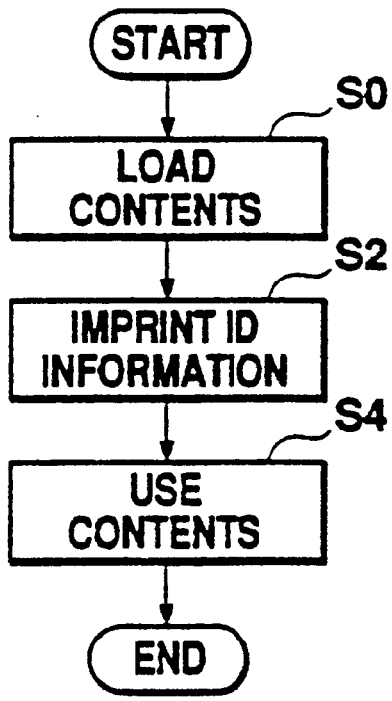
FIG. 2 is a flowchart showing an operation for ID imprinting when a PC 4 receives a content.

FIG. 2 is an operational flowchart of the PC 4 when it receives a content. The PC 4 first downloads the content from the server 2 over the network 9 (S0). A program for decoding or decrypting the content is also downloaded from the server. This program may be included in a downloaded viewer or browser that turns the encrypted content into a usable form. A user ID information associated with the PC 4 or its user is embedded in the viewer. The ID is imprinted in the content when the viewer decodes the content (S2). After the ID is imprinted, use of the content such as for displaying or copying is enabled.

Figure 3:
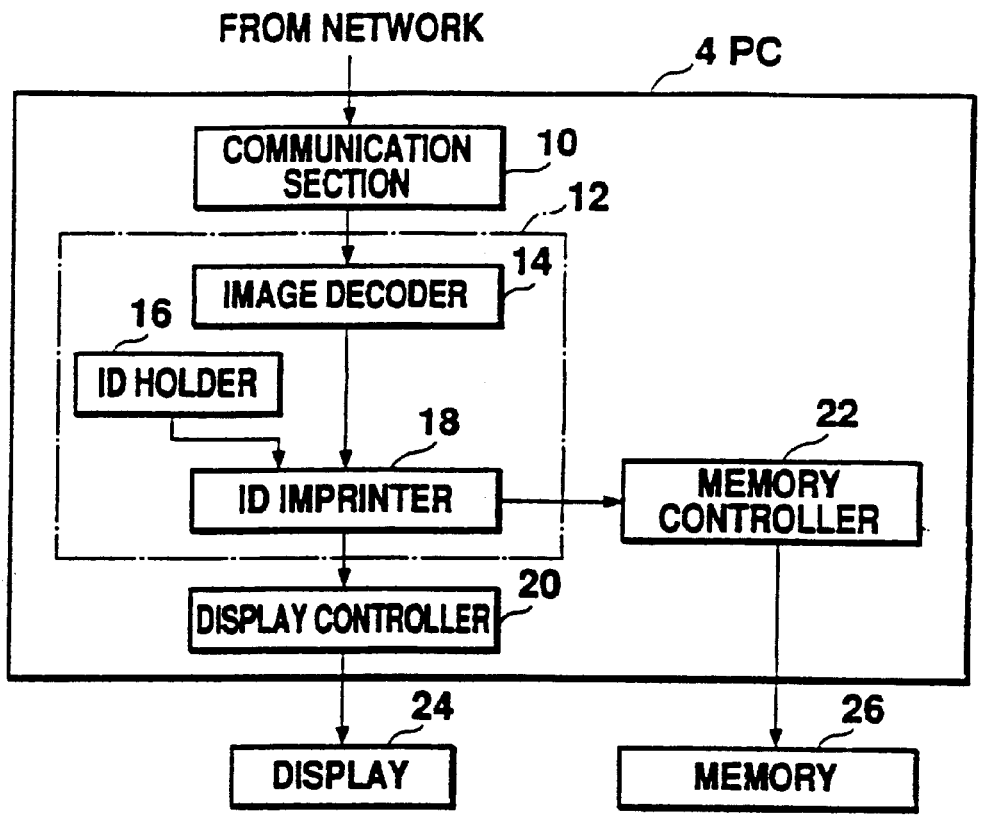
FIG. 3 is a diagram showing a structure relative to ID imprinting within the PC 4.

FIG. 3 shows the structure relating to ID imprinting within the PC 4. In the following example, the content is assumed to be an image. The user first sends a request for a content to a content manager or supplier (not shown) which runs the server 2. The content manager, after authentication of the user, transmits the requested content and a viewer 12 to the PC 4 via the network. These are received by a communication section 10 of the PC 4.

The viewer 12 received in the PC 4 may now be used to decrypt and display the received content. As shown in FIG. 3, the content is inputted to the viewer 12. The viewer 12 comprises an image decoder 14 for decoding an image which has been compressed or encoded by the content manager before transmission to the PC 4, an ID holder 16 for storing IDs, and an ID imprinter 18 for imprinting the ID read from the ID holder 16 onto a decoded image. The image decoder 14 has a decryption algorithm. The content manager transmits the viewer 12 after storing an ID unique to the user requesting the content in the ID holder 16. The viewer 12 may be a plug-in type device that is incorporated into existing Internet browsers.

As a measure for preventing use of content before ID imprinting, for instance, a memory area in the PC 4 that stores a content without an ID imprinted therein is protected by the ID imprinter 18 so that reading of such a content is prevented. Specifically, the system is designed so as to be interrupted or reset if a read access is made to the memory area containing a content without an ID. Once an ID is imprinted, this protection is removed, enabling the image to be used as desired.

As shown in FIG. 3, an image having an ID imprinted therein is transmitted to a display controller 20, where it is converted into display format for a display 24. A memory controller 22 writes data to a storage device 26, which may be a hard disc unit or the like, to store the decoded image therein.

Figure 4:
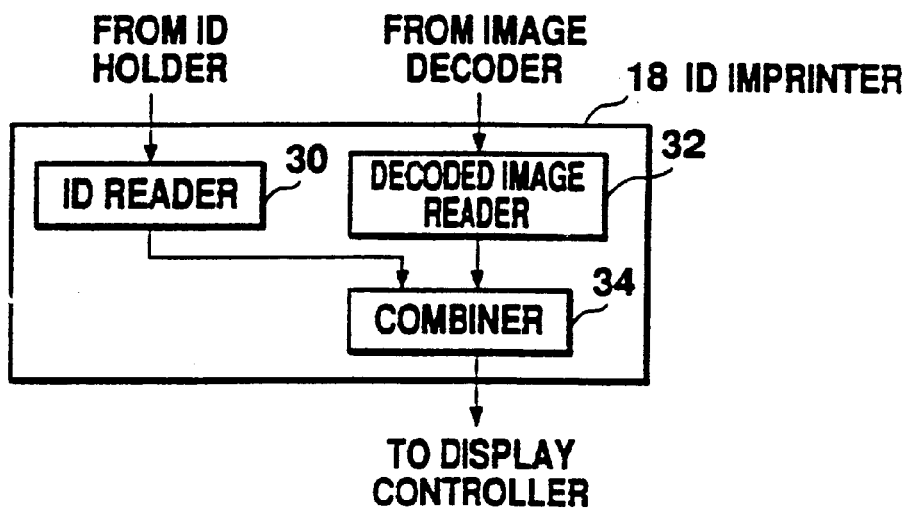
FIG. 4 is a diagram showing the internal structure of an ID imprinter 18 from FIG. 3.

FIG. 4 is a diagram showing an internal structure of the ID imprinter 18 shown in FIG. 3 according to one embodiment of the present invention. The imprinter 18 comprises an ID reader 30 for reading an ID from the ID holder 16, a decoded image reader 32 for reading a decoded image, and a combiner 34 for imprinting an ID into a predetermined location such as the leading, middle, or trailing part of the decoded image data. When an ID consists of n bits of data and the luminance of image pixels in the content is expressed in multiscale, the combiner 34 for instance sequentially replaces the least significant bits (LSBs) of the luminance of n pixels from the leading part of the image by the n bits of ID data.

In operation, the user of the PC 4 requests the server 2 run by the content manager to transmit a content. The content is encrypted on the server 2 and then sent with the viewer 12 to the PC 4 via a network. The communication section 10 of the PC 4 receives the transmitted content, and forwards it to the viewer 12, which has been received from the network. Within the viewer 12, the image decoder 14 decodes the content, and forwards it to the ID imprinter 18. The ID reader 30 in the ID imprinter 18 reads the ID from the ID holder 16 and supplies it to the combiner 34. The decoded image reader 32 reads the decoded image, and forwards it to the combiner 34. Having received the ID and the decoded image, the combiner 34 replaces the LSBs of the luminance in the aforementioned manner to thereby imprint the ID onto the image. The image having the ID is displayed on the display 24. The ID imprinted image may also be supplied to the memory 26. If a subsequent unauthorized attempt is made to modify or reproduce the ID-imprinted image stored in the memory 26, copies of such modified or reproduced image will carry the ID information imprinted in the image stored in the memory 26. It is therefore possible to identify the party making the unauthorized copies.

Figure 5:
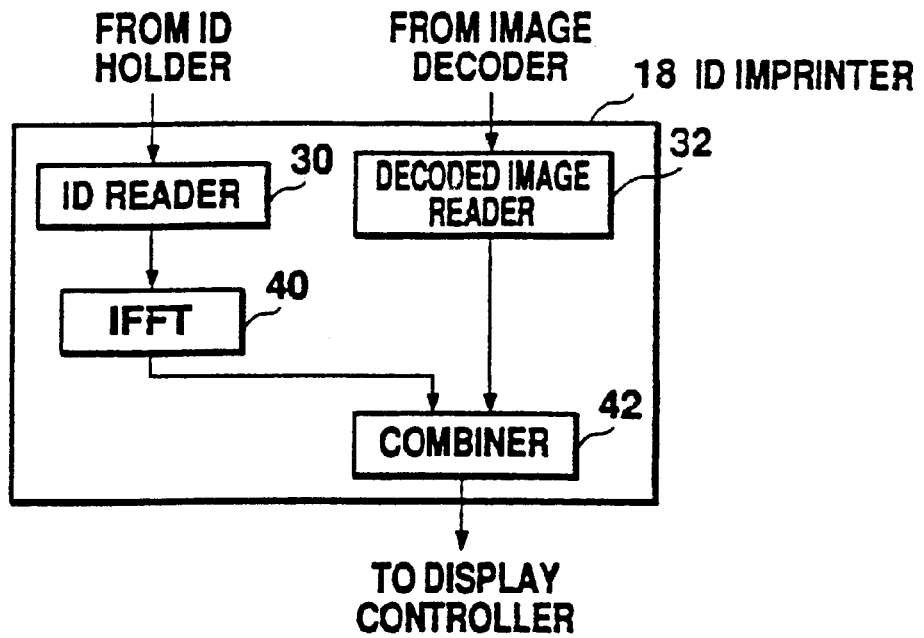
FIG. 5 is a diagram showing another structure of the ID imprinter 18 shown in FIG. 3.

FIG. 5 is a diagram showing an alternative structure of the ID imprinter 18 according to another embodiment of the present invention. In this figure, the same members as shown in FIG. 4 are given the same reference numerals and their explanation is not repeated. The structure in FIG. 5 comprises an IFFT section 40 for performing an inverse fast Fourier transform (IFFT) on a signal representing an ID, and a combiner 42 for combining the transformed ID (i.e. the output of the IFFT section 40) into the decoded image.

In this embodiment, the ID information is represented as a signal in the frequency domain. When imprinting such an ID, an inverse orthogonal transform is applied to the frequency signal representing the ID information to generate a bit pattern in the content domain, which is then imprinted in the digital content. In this specification, the term "content domain" is used to denote the domain representing the data in the digital content, while the term "frequency domain" is used to denote a mapping of the content domain through an orthogonal transform. When the content is a two-dimensional image (an example used in the illustration below), the content domain is a two-dimensional space domain, and the corresponding frequency domain is a two-dimensional spatial frequency domain. When the content is audio, the content domain may be a time domain and the frequency domain may be a one-dimensional frequency domain.

Figure 6:
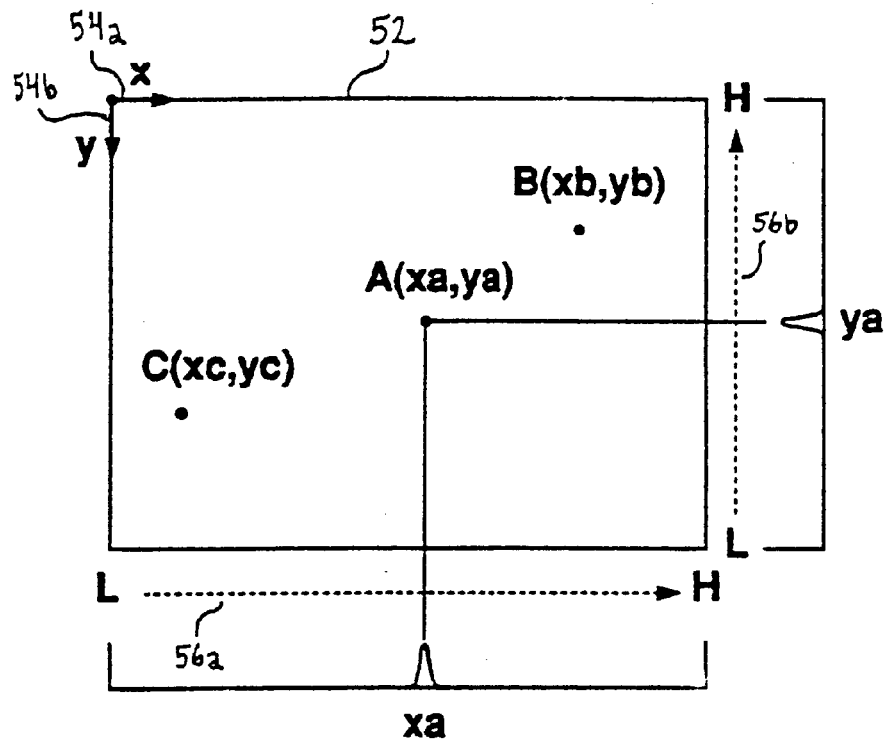
FIG. 6 is a diagram showing the relationship between ID and a spatial frequency, expressed using a spectrum domain.

FIG. 6 is a diagram showing examples of representations of ID information as signals in the frequency domain. A two-dimensional image is used as an example of a content. The rectangle 52 represents a two-dimensional spatial frequency domain for the two-dimensional space domain. The arrows 54a and 54b indicate the x and y directions of the corresponding space domain, whereas the arrows 56a and 56b indicate the directions of increased frequencies in the frequency domain corresponding to the x and y directions of the space domain, respectively. In this frequency domain, signals representing the ID information for three users A, B, and C are plotted at their respective positions (xa, ya), (xb, yb), and (xc, yc). For user A, for example, the frequency signal has a steep peak centered at the point (xa, ya). The steep peak may have finite widths, or it may be a delta-function. In this manner, the ID information for a user is represented by a point in a two-dimensional frequency domain.

Figure 7:
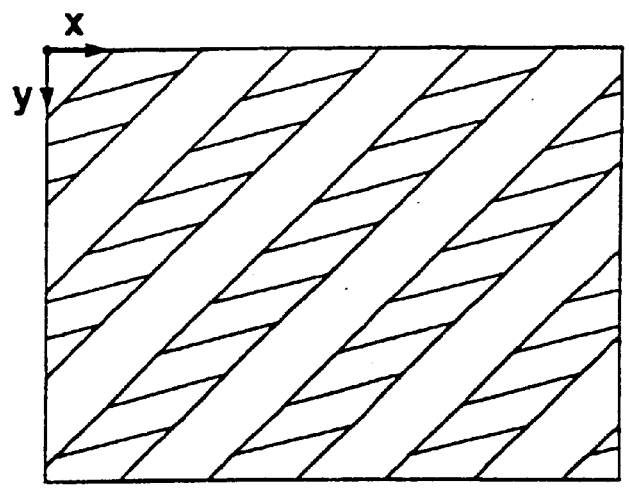
FIG. 7 is a diagram showing ID of a user converted into an actual image data pattern by IFFT section 40 in FIG. 5.

FIG. 7 is a diagram showing user A's ID information converted into a bit pattern in the space domain by the IFFT section 40. The pixels in the bit pattern showing in FIG. 7 have a value of "1" in the shaded areas and "0" in the unshaded areas. In this example, since the frequency signal representing user A's ID information is located substantially at the center of the spectrum domain with respect to both the x and y directions (see FIG. 6), the spatial frequencies of the shaded and unshaded areas shown in FIG. 7 are more or less the same in the x and y directions. For user B, for example, since the frequency signal representing that user's ID information has higher frequencies in both directions, the shaded and unshaded areas in the resulting bit pattern will be narrower (not shown).

Figure 8:
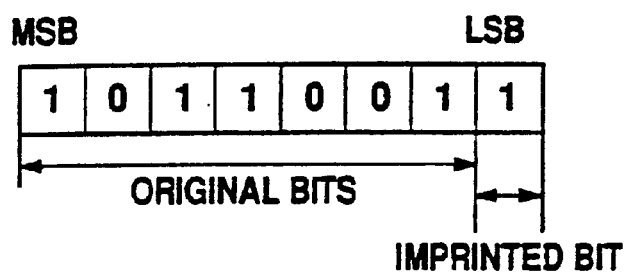
FIG. 8 is a diagram explaining a method for imprinting a bit pattern shown in FIG. 7 onto a decoded image.

FIG. 8 is a diagram explaining a method for imprinting a bit pattern containing ID information, such as that shown in FIG. 7, onto the decoded image (the digital content). In this example, luminance values of the pixels of the decoded image are expressed in eight-bit binary data. The ID information is imprinted in the decoded image by replacing the LSB of the luminance value of each pixel by the value of the corresponding pixel in the bit pattern containing the ID information. Thus, in this example, the LSB of a pixel in the decoded image located in an area corresponding to a shaded area in FIG. 7 is replaced by "1", and the LSB of a pixel located in an area corresponding to a unshaded area in FIG. 7 is replaced by "0." The remaining seven bits of the luminance value of the pixel are unchanged from the decoded image. Thus, in this embodiment, an ID is imprinted over the entire image or an extended portion thereof. This method is advantageous as a countermeasure against partial cut-off of the content, as the extended portion over which the ID is imprinted may be chosen such that the cut off of which would substantially impair the usefulness of the content.

Specific embodiments of the present invention for imprinting ID information have been described. Many variations of the embodiments are possible, some of which are described below.

First, although a content is distributed via a network in the above-described embodiments, the content may also be distributed by storing it in a medium such as a CD-ROM or a floppy disc and loading it onto a PC. The embodiments described above are applicable to such other methods of content distribution.

Second, although a still image is used in the above-described embodiments as an example of a digital content, the methods may be applied to other types of digital content, such as motion images (e.g. video) or audio content. For motion images, ID information may be divided into plural portions and different portions may be imprinted into different image frames. For audio content, the image decoder 14, the display controller 20, and the display 24 in FIG. 3 may be replaced by an audio decoder, an audio output controller, and a speaker, respectively. Further, one-dimensional IFFT is sufficient for audio content, as it is one dimensional data. In addition, although ID information is imprinted into the bits of the luminance values in the case of images, it may be imprinted into the LSBs of frequency signals or the like in the case of an audio content.

Third, an ID is not necessarily stored in the LSBs of a content. Any bits of quantified data may store the ID as long as the effects on the perceived quality of the content are insignificant. It should be noted that even perceptible imprinting may be employed as a visual watermark.

Fourth, although an ID is imprinted into a lower bit irrespective of upper bits in the aforementioned embodiment, an offset may be given to a lower bit such that the whole data including upper bits contains the ID.

Figures 12, 13, 14, 15:
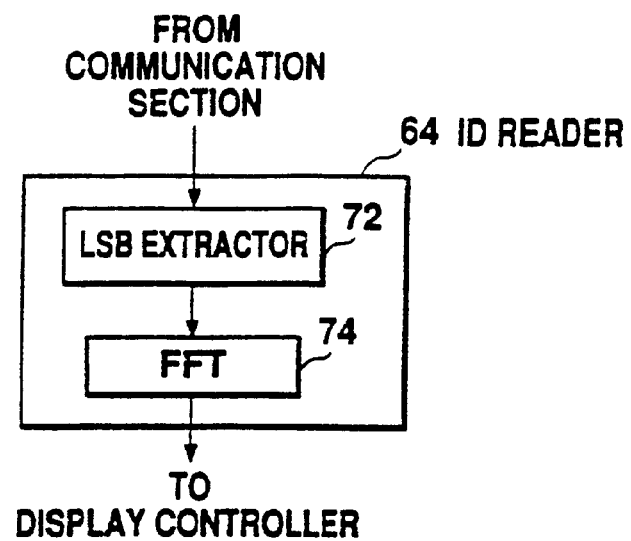
FIG. 12 is a diagram showing another structure of the ID reader shown in FIG. 11.
FIG. 13 is a diagram showing an area consisting of 3×3 pixels.
FIG. 14 is a diagram showing the luminance of the 3×3 pixel area of FIG. 13 expressed using modulo 3 arithmetic.
FIG. 15 is a diagram showing a data pattern to be imprinted as ID into the 3×3 pixel area of FIG. 13.
Figure 16:
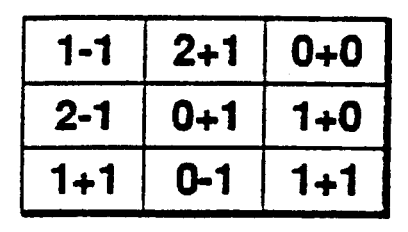

FIG. 13 shows an example of a 3×3 pixel area in a content such as an image, where the luminance of the respective pixels are "10, 8, 0 . . . " as shown. FIG. 14 is a diagram showing the luminance of the same 3×3 pixel area in the image, but expressed using modulo 3 arithmetic. Using this arithmetic, the corresponding value of a pixel whose luminance is 10, for instance, becomes 1. FIG. 15 is a diagram showing a sample data pattern representing ID information, generated using methods described earlier, to be imprinted into the 3×3 pixel area of the image shown in FIG. 14. The ID pattern is also expressed in modulo 3 arithmetic. In this example, 0's, 1's, and 2's are to be imprinted into the first, second, and third rows of pixels, respectively. FIG. 16 is a diagram showing the state in which an offset of −1, 0, or 1 is added to each pixel value of the 3×3 pixel area shown in FIG. 14 to obtain the corresponding pixel value of the 3×3 pixel area shown in FIG. 15. In operation, the ID information is imprinted into the 3×3 pixel area of the image shown in FIG. 13 by adding to each pixel an offset value −1, 0 or 1 according to the calculation shown in FIG. 16. According to this method, an offset is added to the luminance data as a whole, so that the whole data, including the upper bits, contain the ID.

Since this method can prevent direct exposure of an ID unlike imprinting it in the lower bits, security is increased. Another advantage is that data other than "0" and "1", such as "2", is also imprintable. Although modulo 3 arithmetic is mentioned here, modulo arithmetic based on other numbers may be used. Any other mathematical, boolean algebraic or cryptographic approach may be employed.

Fifth, in the aforementioned embodiments, the combiner 34 (FIG. 4) imprints ID information into a predetermined location such as the leading part of the data sequence. The predetermined location may be one where, when slight shifts in data values are given, the effects are hardly perceivable. Thus, the quality of the content (quality of a still image, motion image, sound, text and so forth) is hardly influenced.

Sixth, in the embodiment shown in FIG. 3, the image decoder 14 and the ID imprinter 18 are separately provided. These elements may be integrated into one element to thereby allow simultaneous execution of image restoration and ID imprinting.

Seventh, in the embodiment shown in FIG. 3, the program for decrypting and/or decoding is included in a viewer or a browser. The program may take any other form as long as it can restore the content into a suitable format for use by the user.

Eighth, although the ID information for one user is represented by one point in the frequency domain (FIG. 6), the ID information may be represented in other forms. For instance, a set of a plurality of discrete points or a two dimensional region may be employed to represent the ID information for one user.

Figure 9:
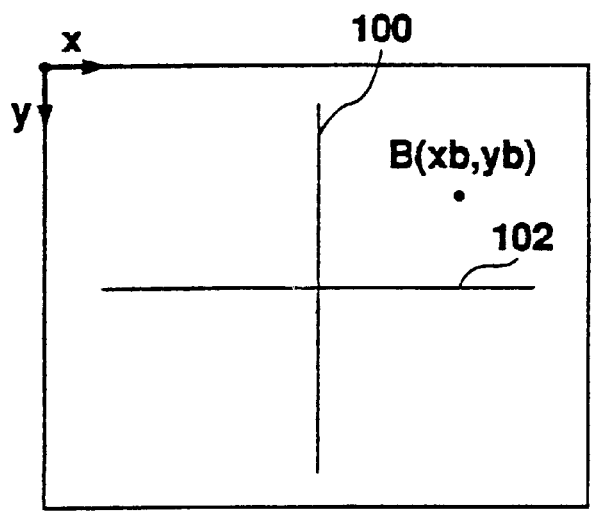
FIG. 9 is a diagram showing a spectrum domain of FIG. 6 including fixed reference information superimposed therein.

Ninth, in a frequency domain representation such as that shown in FIG. 6, reference information such as two straight lines 100, 102 shown in FIG. 9 may be added. This reference information can be utilized when reading the imprinted ID information from a content since its position is fixed and known in the frequency domain. By the help of the reference information, the location of the ID can be specified with more certainty to thereby identify the user represented by that ID even when the content has been modified through, e.g., rotation or enlargement.

Methods for imprinting ID information have been described. Methods for reading imprinted ID information will be described next.

If a content is illegally reproduced or modified (hereinafter referred to as an illegal action), it is desired that the unauthorized offender be identified. This can be achieved by reading the ID information imprinted into the content. A device for reading imprinted ID information (hereinafter referred to as a detector) may be provided anywhere in a network. A proxy server, for instance, may be equipped with such a detector.

Figure 10:
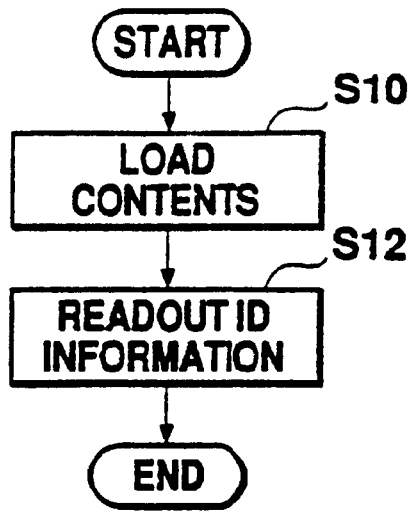
FIG. 10 is a flowchart showing an operation of a detection device for reading ID imprinted in the content.

FIG. 10 is a flowchart showing the operation of a detector. The detector loads a content from a storage device or a memory medium (S10), and reads the ID information imprinted therein (S12). If an illegal action is detected, the detector resorts to appropriate measures, such as notifying a content manager of the unauthorized offender.

Figure 11:
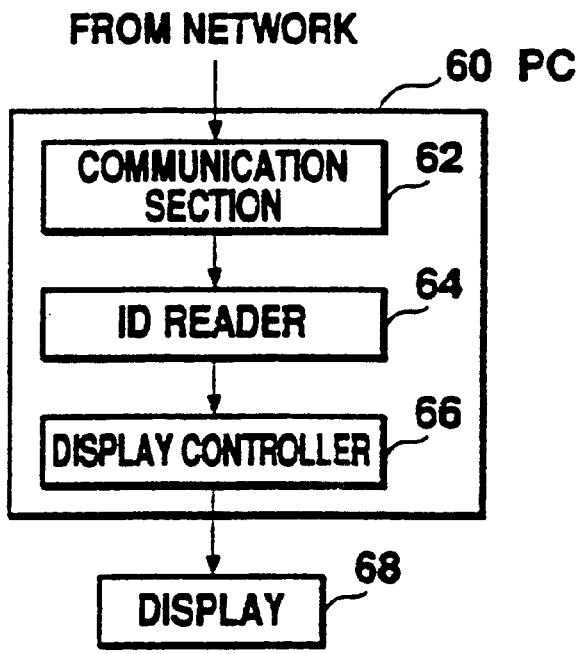
FIG. 11 is a diagram showing a structure of ID reader within a detection device.

FIG. 11 is a diagram showing an embodiment of the detector for reading ID information imprinted in a content. The detector 60, which may be in a PC, comprises a communication section 62 for obtaining a content from a network, an ID reader 64 for reading the ID from the obtained content, and a display controller 66 for controlling a display 68 so as to display the read ID.

In this embodiment, the ID reader 64 extracts information from a predetermined location, for instance, the LSBs at a leading part of a data sequence of the obtained content, and reconstructs the ID based on the extracted data. If this process does not result in any ID information that meaningfully identifies a user, then the content is judged to be original, i.e., having no user ID information imprinted. On the other hand, if a content with a user's ID imprinted therein is found on a network, the user identified by the imprinted ID may have illegally distributed the content. Based on the ID, the possible illegal action is traced.

FIG. 12 is a diagram showing an alternative ID reader according to another embodiment of the present invention. This ID reader operates to read an ID imprinted as spatial frequency information in a content. The ID reader 64 comprises an LSB extractor 72 for extracting the LSBs from the obtained content to form a bit pattern, and a FFT section 74 for performing fast Fourier transform (FFT) on the bit pattern formed by the extracted LSBs.

The operation here is a reverse operation of that shown in FIGS. 6 to 8. The LSBs, which represent the imprinted ID information, are first extracted (FIG. 8). The bit pattern formed by the LSBs in the content is then detected (FIG. 7). Spatial frequencies of the bit pattern in the x and y directions, respectively, are calculated by the FFT section 74 from the bit pattern. In the sample bit pattern shown in FIG. 7, the FFT calculation reveals user A's ID shown in FIG. 6. The offender is thereby identified as user A.

This method is advantageous in that it does not require comparing the suspect content and the original content in order to detect the ID.

The above-described methods for reading imprinted ID information may have many 5 variations. Each variation of the ID imprinting method described earlier in this specification may have a corresponding variation of the ID reading method. For example, the ID can be read in cases where an offset has been added to a lower bit using a method such as the one described earlier with reference to FIGS. 13–16.

Further, when an ID is imprinted in a predetermined location of the content, such as a location where shifts in data values do not produce significant perceivable effects, the readout method is provided to detect the same location consistent with the ID imprinting method. Generally speaking, ID reading can be done as long as the imprinter and the reader adopt the same imprinting/readout scheme.

In addition, although the detector is connected to a network in the above embodiments, it may be an off-line, stand alone type if it checks only contents stored in storage media.

Moreover, in the described embodiments, the ID imprinting is carried out at the information terminals where the content is used, i.e. at the user end. It will be apparent to a skilled artisan, however, that the various methods described herein for imprinting ID information in a content are equally applicable to a content distribution scheme in which ID imprinting is carried out at the content provider end.

It will, of course, be understood that modifications of the present invention, in its various aspects, will be apparent to those skilled in the art. Other embodiments are also possible, their specific designs depending upon the particular application. Therefore, the scope of the invention should not be limited by the particular embodiments herein described but should be defined only by the appended claims.

What is claimed is:

1. A method for distributing a digital content on a computer network, said method comprising:
   receiving via the computer network a request for a digital content from an information terminal, the request identifying the information terminal or a user thereof;
   obtaining an encoded version of the digital content;
   generating a decoding program such that ID information representing the information terminal or user is embedded therein, and wherein the decoding program is programmed to perform the function of decoding the encoded digital content at the information terminal to produce a decoded digital content having the ID information imprinted therein without additional ID verification being performed at the information terminal by the user thereof;
   transmitting via the computer network the decoding program to the information terminal; and
   transmitting via the computer network the encoded digital content to the information terminal in response to the request.

2. The method of claim 1, wherein the ID information is imprinted into the decoded digital content over an extended portion of the decoded digital content.

3. The method of claim 2, wherein the extended portion of the decoded digital content defines a content domain, and wherein the ID information is represented as a signal in a frequency domain associated with the content domain.

4. The method of claim 3, wherein the frequency domain is a mapping of the content domain via an orthogonal transform, and wherein the ID information imprinting comprises:
   inverse-transforming the frequency-domain representation of the ID information into a content-domain representation of the ID information via an inverse of the orthogonal transform; and
   imprinting the inverse-transformed ID information into the loaded content.

5. The method of claim 3, wherein the ID information is imprinted into the decoded digital content in the form of reference information in the frequency domain.

6. The method of claim 1, wherein the decoding program is programmed to also perform the function of enabling use of the decoded digital content at the information terminal only after imprinting the ID information.

7. The method of claim 1, wherein the decoding program is a plug-in type program.

8. The method of claim 1, wherein the decoding the encoded digital content to produce the decoded digital content having the ID information imprinted therein comprises simultaneously decoding the encoded content and imprinting a representation of the ID into the decoded content.

9. A computer readable medium containing computer executable instructions for distributing a digital content on a computer network, which, when operating in a processor cause the processor to perform the functions of:

receiving via the computer network a request for a digital content from an information terminal, the request identifying the information terminal or a user thereof;

obtaining an encoded version of the digital content;

generating a decoding program such that ID information representing the information terminal or user is embedded therein, and wherein the decoding program is programmed to perform the function of decoding the encoded digital content at the information terminal to produce a decoded digital content having the ID information imprinted therein without additional ID verification being performed at the information terminal by the user thereof;

transmitting via the computer network the decoding program to the information terminal; and transmitting via the computer network the encoded digital content to the information terminal in response to the request.

10. The computer readable medium of claim 9, wherein the decoding program is a single program that both imprints the ID information and decodes the encoded digital content.

11. A computer readable medium containing computer executable instructions for decoding encoded digital content at an information terminal, said computer executable instructions having been generated by a server based on a request via computer network from the information terminal for a digital content, the request identifying the information terminal or a user thereof; and sent by the server to the information terminal and said computer executable instructions being generated such that ID information representing the information terminal or a user thereof is embedded therein, said computer executable instructions being such that, when operated on a processor in the information terminal, they cause the processor to perform the functions of:

loading an encoded digital content; and decoding the encoded digital content at the information terminal to produce a decoded digital content having the ID information imprinted therein, wherein the processor performs the functions without additional ID information verification being performed at the information terminal by the user thereof.

12. The computer readable medium of claim 11, further containing computer executable instructions causing the processor to perform the function of displaying the decoded digital content.

13. A method for distributing a digital content on a computer network, said method comprising:

receiving via the computer network a request for a digital content from an information terminal, the request identifying the information terminal or a user thereof;

obtaining an encoded version of the digital content;

generating a plug-in type decoding program such that ID information representing the information terminal or user is embedded therein, and wherein the decoding program includes computer executable instructions to cause a processor at the information terminal to perform the functions of:

simultaneously decoding the encoded digital content and imprinting the ID information as a signal in a frequency domain therein to produce imprinted decoded digital content having the ID information imprinted therein; and enabling use of the imprinted decoded digital content, without additional ID verification being performed at the information terminal by the user thereof;

transmitting via the computer network the decoding program to the information terminal; and transmitting via the computer network the encoded digital content to the information terminal in response to the request.

* * * * *

UNITED STATES PATENT AND TRADEMARK OFFICE
CERTIFICATE OF CORRECTION

PATENT NO. : 6,912,652 B2
DATED : June 28, 2005
INVENTOR(S) : Hirofumi Ito and Shinichi Yamashita It is certified that error appears in the above-identified patent and that said Letters Patent is hereby corrected as shown below:

<u>Title page,</u>
Item [63], Related U.S. Application Data, should read:
-- Continuation of application No. PCT/US97/20309, filed on Nov. 6, 1997. --.

Signed and Sealed this

Third Day of January, 2006

JON W. DUDAS
*Director of the United States Patent and Trademark Office*